United States Patent [19]
Arase et al.

[11] Patent Number: 5,894,120
[45] Date of Patent: Apr. 13, 1999

[54] CARD READER WITH PIVOTING CASING

[75] Inventors: Shinji Arase, Tamana; Masanobu Katsumura, Kumamoto; Tsutomu Harada, Tamana, all of Japan

[73] Assignee: Matsushita Electric Industrial Co., Ltd., Osaka, Japan

[21] Appl. No.: 08/699,308

[22] Filed: Aug. 19, 1996

[30] Foreign Application Priority Data

Aug. 31, 1995 [JP] Japan .................. 7-223315

[51] Int. Cl.⁶ ........................................ G06F 3/12
[52] U.S. Cl. ........................................ 235/432
[58] Field of Search ........................ 235/432, 454, 235/449, 486, 380

[56] References Cited

U.S. PATENT DOCUMENTS

| | | | |
|---|---|---|---|
| 3,760,375 | 9/1973 | Irwin et al. | 340/172.5 |
| 4,602,351 | 7/1986 | Shimamura et al. | 365/52 |
| 4,812,632 | 3/1989 | Kakinuma et al. | 235/479 |
| 4,870,604 | 9/1989 | Tatsuno | 364/708 |
| 5,221,838 | 6/1993 | Gutman et al. | 235/379 |
| 5,484,991 | 1/1996 | Sherman et al. | 235/472 |
| 5,558,021 | 9/1996 | Erhard et al. | 101/232 |
| 5,559,317 | 9/1996 | Wong et al. | 235/449 |
| 5,574,272 | 11/1996 | Seo et al. | 235/454 |
| 5,592,528 | 1/1997 | Nelson et al. | 379/21 |
| 5,751,804 | 5/1998 | Mendolia | 379/433 |
| 5,754,962 | 5/1998 | Griffen | 455/569 |
| 5,768,371 | 6/1998 | Synder | 379/446 |

FOREIGN PATENT DOCUMENTS

4104757  9/1992  Japan .

*Primary Examiner*—Anita Pellman Gross
*Assistant Examiner*—Daniel Sherr
*Attorney, Agent, or Firm*—Lowe Hauptman Gopstein Gilman & Berner

[57] ABSTRACT

A portable card reader is provided which reads data stored in a card inserted thereinto and/or records given data on the card. The card reader includes upper and lower casings which are pivotably supported so that they are opened to expose a card feeding path defined in the card reader for facilitating easy removal of the card if jammed. The card reader also includes a memory for storing therein the data read out of the card and an input/output terminal for establishing data communication with an external device such as a computer.

19 Claims, 6 Drawing Sheets

CARD READER WITH PIVOTING CASING

BACKGROUND OF THE INVENTION

1. Technical Field

The present invention relates generally to a card reader for reading data stored in a card, and more particularly to a portable card reader and a charging unit for charging a storage battery built in a card reader.

2. Background of Related Art

Conventional card readers are usually used as it is built in devices. However, in recent years, portable card readers have been developed.

The portable card readers, however, have the following drawbacks.

When the remaining capacity of a battery is decreased below a given level, the battery must be charged so that it becomes impossible to use the card reader until completion of the charge.

If a card is jammed in the card reader, it requires a relatively long period of time until the jammed card is removed completely. Additionally, it is difficult to clean the inside of the card reader for compactness.

Further, it is impossible to manage the use of a card through another device.

SUMMARY OF THE INVENTION

It is therefore a principal object of the present invention to avoid the disadvantages of the prior art.

It is another object of the present invention to provide a card reader designed to offer easy replacement of a battery, easy trouble shooting, and easy management of use of a card.

It is a further object of the present invention to provide a charging unit for a portable card reader.

According to one aspect of the present invention, there is provided a card reader which comprises: a body including a first case and a second case which are pivotably supported so as to be opened for exposing the inside of the body; a storage battery disposed within said body; a card feeding path defined in said body; a feeding roller disposed within said body, a drive means for driving said feeding roller to feed a card inserted into an inlet formed in said body along said card feeding path; a data reading means for reading data out of the card: a printing means for printing a given character on the card; and a control means for controlling operations of said data recording means and said printing means to perform at least one of functions of reading data out of the card during traveling along said card feeding path and printing the given character on the card during traveling along said card feeding path.

In the preferred mode of the invention, the first and second casings are opened to expose said card feeding path.

The data reading means reads out the data out of the card during traveling along said card feeding path in a first feeding cycle. The printing means prints the given character on the card during traveling along said card feeding path in a second feeding cycle.

A card inlet is further provided which is formed in said body. The first direction is a direction from said inlet port to said reading means.

The body is of the size, as shown below.

60 mm<width<100 mm
150 mm<length<300
30 mm<thickness<90 mm
100 g<weight<1000 g

According to another aspect of the invention, there is provided a card reader which comprises: a body; a storage battery disposed within said body; a card feeding path defined in said body; a feeding roller disposed within said body; a drive means for driving said feeding roller to feed a card inserted into an inlet formed in said body along said card feeding path; a data reading means for reading data out of the card traveling along said card feeding path; a printing means for printing a given character on the card traveling along said card feeding path; an input means for inputting data into a memory disposed within said body; a storage means for storing the data read out of the card by said data reading means; a communication means for establishing communication with an external device; and a data transferring means for transferring the data stored in said storage means to the external device through said communication means when in response to a request signal from the external device.

In the preferred mode of the invention, said body includes a first case and a second case which are pivotably supported so as to be opened for exposing said card feeding path.

A display means is further provided which displays a given character. The display means may display the data inputted from the input means.

The card feeding path is defined between the first and second casings of said body.

The storage means includes a ROM storing therein a program for performing a sequence of operations of the card reader and a RAM storing therein the data read out of the card through said data reading means.

The communication means includes an input/output terminal for electric connection with the external device.

The printing means includes a thermal head.

The storage battery is a rechargeable battery.

The body is of the size, as shown below.

60 mm<width<100 mm
150 mm<length<300
30 mm<thickness<90 mm
100 g<weight<1000 g

According to a further aspect of the invention, there is provided a card reader charging apparatus which composes a charging body and a first mount portion formed in said charging body for mounting a card reader to charge a storage battery built in the card reader. The card reader includes: a body including a first case and a second case which are pivotably supported so as to be opened for exposing the inside of the body; a storage battery disposed within said body; a card feeding path defined in said body; a feeding roller disposed within said body; a drive means for driving said feeding roller to feed a card inserted into an inlet formed in said body along said card feeding path; a data reading means for reading data out of the card traveling along said card feeding path; a printing means for printing a given character on the card traveling along said card feeding path; an input means for inputting data into a memory disposed within said body; a display means for displaying a given character; a storage means for storing the data read out of the card by said data reading means; a communication means for establishing communication with an external device; and a data transferring means for transferring the data stored in said storage means to the external device through said communication means when in response to a request signal from the external device.

In the preferred mode, a second mount portion is further provided which is formed in said charging body for mounting a spare storage battery to charge the spare storage battery.

The first and second mount portion are provided with recessed portion formed in said charging body.

The body is of the size, as shown below.

60 mm<width<100 mm 150 mm<length<300

30 mm<thickness<90 mm 100 g<weight<1000 g

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
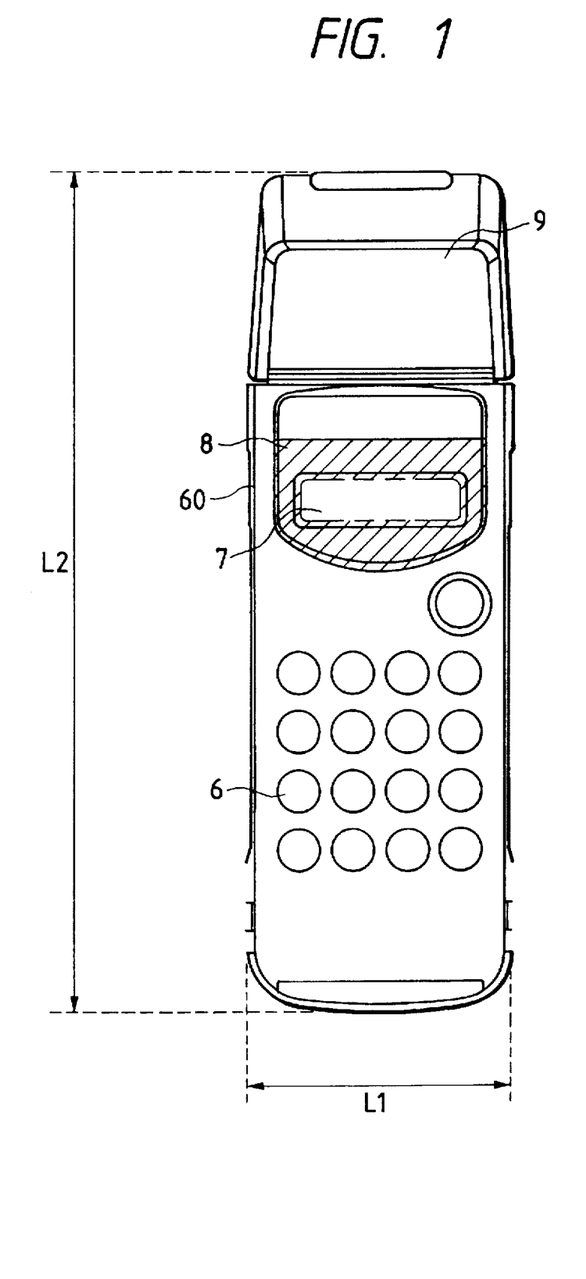
FIG. 1 is a plan view which shows a card reader according to the present invention.
Figure 2:
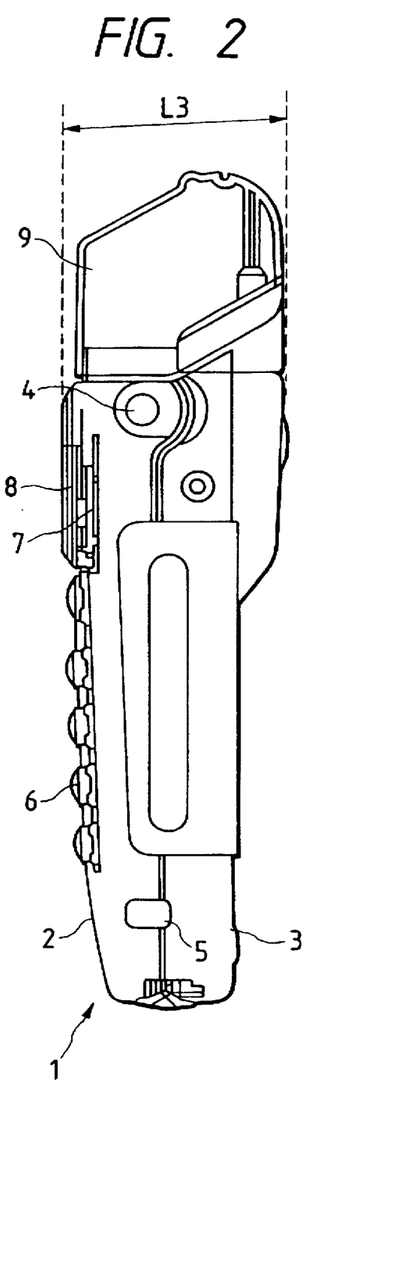
FIG. 2 is a side view of the card reader in FIG. 1.
Figure 3:
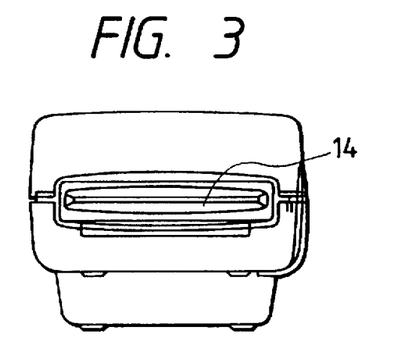
FIG. 3 is an end view of the card reader in FIG. 1.

Referring now to the drawings, particularly to FIGS. 1 to 3, there is shown a card reader 200 according to the invention.

The card reader 200 generally includes a body 1, lock tabs 5, a keyboard 6, a liquid crystal display 7, a display panel 8, and a rechargeable storage battery 9.

The body 1 consists of two parts: an upper casing 2 and a lower casing 3 which are pivotably supported by a shaft 4. The casings 2 and 3 are made of a metal plate or resin material. Particularly, a light weight and weatherproofing resin is preferable.

The lock tabs 5 are formed on both sides of the casing 2 for establishing tight engagement of the casing 2 with the casing 3. The release of the engagement allows the casings 2 and 3 to rotate about the shaft 4 to expose the inside of the body 1 for easy removal of a jammed card and cleaning of the inside of the body 1.

The keyboard 6 is disposed on the casing 2 for data entry. Instead of the keyboard 6, a voice input system, an optical input system such as a CCD, or a magnetic input system may be used.

The liquid crystal display 7 is disposed on the casing 2 which indicates input data and given characters. Instead of the liquid crystal display 7, a CRT, an LED, or a photochromic glass may be used.

The display panel 8 is disposed on the casing 2 to cover the liquid crystal display 7. The display panel 8 may be made of a transparent resin or glass material.

The battery 9 is detachably installed in the body 1 as a power source for driving given component parts of the card reader 200 and data storage.

The card reader 200 also includes a card inlet 14 and an input/output terminal 60. The card inlet 14 is formed between ends of the casings 2 and 3 for insertion of a card. The input/output terminal 60 is usually used to transfer data stored in an internal memory to an external device such as a computer through a cable. The data transmission between the card reader 200 and another device may alternatively be achieved using an optical system consisting of an optical transmitter and receiver.

Figure 4:
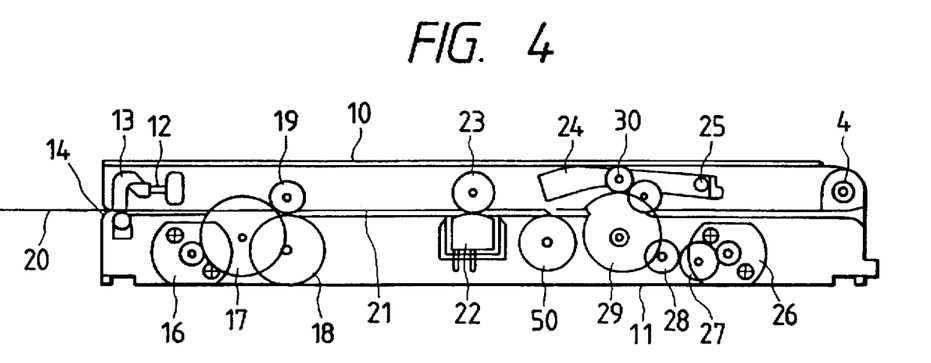
FIG. 4 is a cross sectional view which shows an internal structure of the card reader in FIG. 1.
Figure 5:
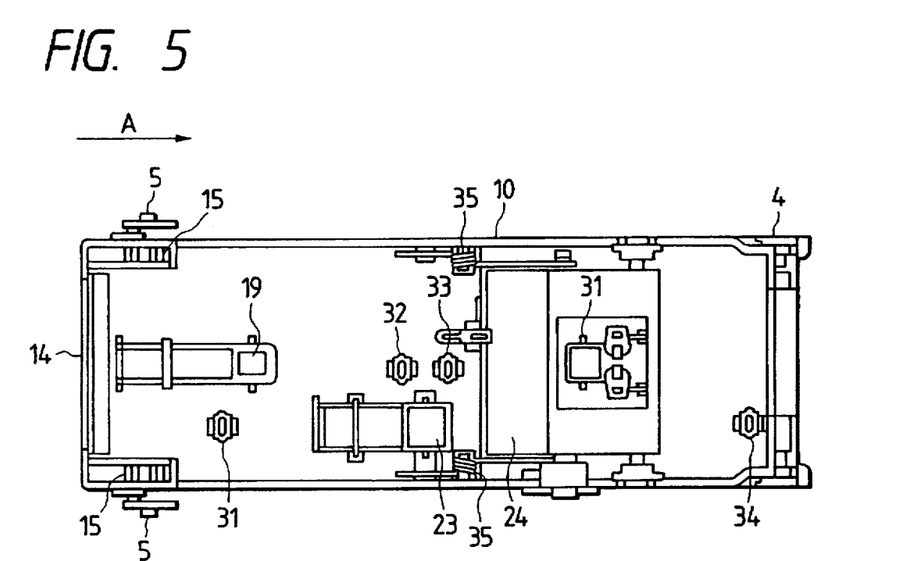
FIG. 5 is a plan view of the internal structure of the card reader in FIG. 4.
Figure 6:
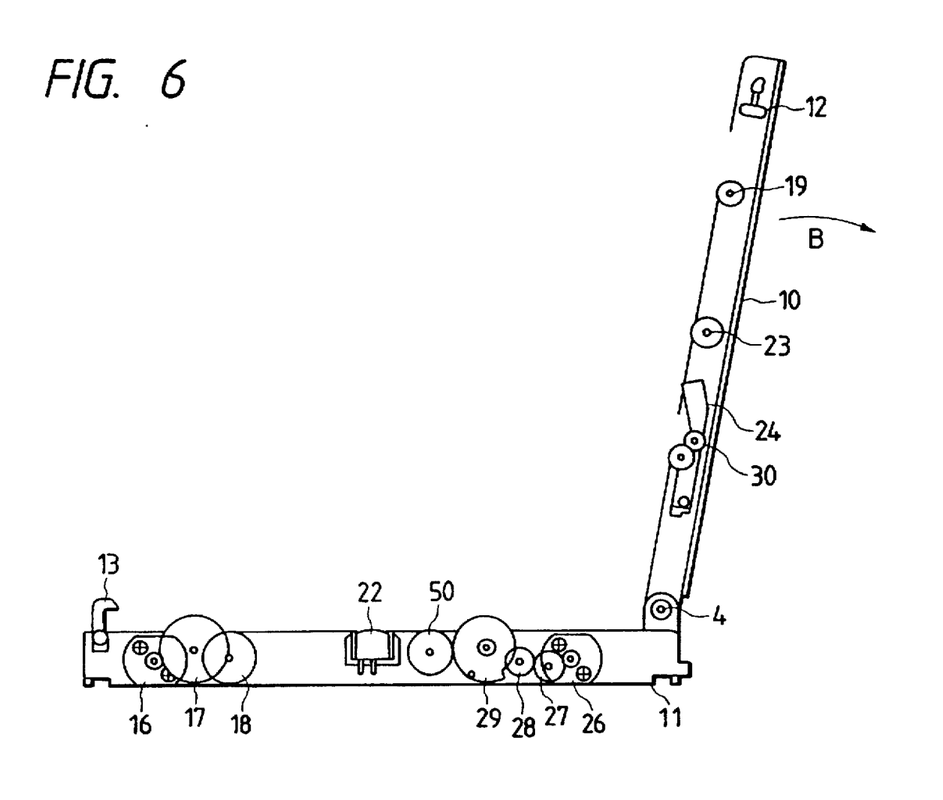
FIG. 6 is an illustration which shows upper and lower chassis of a card reader being opened.

FIGS. 4 to 6 show an internal structure of the card reader 200 from which the body 1 and the battery 9 are omitted for convenience of illustration.

Mechanical chassis 10 and 11 are disposed within the body 1 which are made of a lightweight material such as resin. The chassis 10 is installed in the casing 2 or integrally formed with the casing 2. Similarly, the chassis 11 is installed in the casing 3 or integrally formed with the casing 3. The chassis 10 and 11 are pivotably supported by the shaft 4.

The sliding of the lock tabs 5 in the direction A in FIG. 5 causes engaging members 12 mounted on the chassis 10 to move so that the engaging members 12 are released from hooks 13 disposed on the chassis 11. This allows the chassis 10 and 11 to rotate about the shaft 4. The rotation of the chassis 10 in the direction B in FIG. 6 causes the inside of the card reader 200 to be exposed. Conversely, the rotation of the chassis 10 in a direction opposite to the direction B from the state as shown in FIG. 6 causes the engaging members 12 to engage the hooks 13, respectively, to lock the chassis 10 and 11 together. The lock tabs 5 are urged by springs 15 in a direction opposite the direction A in FIG. 5.

A card feeding path 21 is formed between the chassis 10 and 11 (i.e., the casings 2 and 3). An electric motor 16 is mounted on the chassis 11 to provide torque to a reduction gear 17 and another reduction gear which is connected to the reduction gear 17 and supported by a first shaft (not shown) mounted on the chassis 11. The first shaft also supports a feeding roller 18. Thus, the rotation of the motor 16 causes the feeding roller 18 to rotate. The feeding roller 18 is arranged opposite a driven roller 19 mounted on the chassis 10. The insertion of a card 20 into the card inlet 14 causes the card to be transported along the card feeding path 20 through a nip formed between the feeding roller 18 and the driven roller 19.

A first pulley (not shown) is supported on the first shaft so that it rotates along with the first shaft. A second shaft (not shown) is mounted on the chassis 11. A platen roller 50 is supported by the second shaft. The second shaft has mounted thereon a second pulley. The rotation of the second pulley causes the platen roller 50 to rotate together with the second shaft.

A third shaft (not shown) is disposed between the platen roller 50 and the shaft 4 on which a third feeding roller and a third pulley are mounted.

The first, second, and third pulleys are connected through a conventional belt. The rotation of the motor 16 first causes the reduction gear 17 to rotate so that the first shaft rotates. This causes the first pulley mounted on the first shaft to rotate so that the rotation of the first pulley is transmitted to the second and third pulleys through the belt, thereby rotating the platen roller 50 and the third feeding roller along with the feeding roller 18. A driven roller 31 is mounted on the chassis 10 opposite the third roller to form a nip through which the card 20 is transported.

A magnetic head 22 is installed on the chassis 11 which performs at least one of functions of reading out data magnetically recorded on the card 20 and writing given data on the card 20. It is necessary to select a data reading or writing element according to a form of data recorded on the card 20. For example, an optical pickup device may be used for reading data which is optically recorded on the card 20 or optically writing data on the card 20.

A driven roller 23 is disposed on the chassis 10 opposite the magnetic head 22.

An image-forming head 24 is disposed on the chassis 10. A thermal head or an ink jet head may be used as the image-forming head 24. The image-forming head 24 is supported so as to be pivotable about a shaft 25 in the counterclockwise direction, as viewed in FIG. 4, to be brought into engagement with the platen roller 50. The pivotal movement of the image-forming head 24 in the clockwise direction causes it to be moved away from the card feeding path 21.

An electric motor 26 is mounted on the chassis 1. When the electric motor 26 is turned on, the motor torque is transmitted to a cam 29 through gears 27 and 28. The cam 29 has, as clearly shown in FIG. 4, formed thereon a stepped portion. A disc or cam follower 30 which is mounted on the image-forming head 24 is in contact with the periphery of the cam 29. The rotation of the cam 29 causes the image-forming head 24 to rotate about the shaft 25. When the cam follower 30 engages a portion of the periphery of the cam 29 apart from the center thereof, the image-forming head 24 moves away from the card feeding path 21 against an elastic force of an elastic member (e.g., spring) 35 shown in FIG. 5. Alternatively, when the cam follower 30 engages a portion of the periphery of the cam 29 near the center thereof, the image-forming head 24 enters the card feeding path 21 to engage the platen roller 50 with the aid of the elastic force of the elastic member 35.

Optical sensors 31, 32, and 33 are disposed on the chassis 10 to monitor the position of the card 20 during traveling along the card feeding path 21 and a stop position thereof.

In an mechanical operation, when the card 20 is inserted into the card inlet 14, and the optical sensor 31 detects the insertion of the card 20, the motor 16 is turned on to rotate the feeding roller 18, the platen roller 50, and the third feeding roller to draw the card 20 into the card feeding path 20.

When the optical sensors 32 and 33 detect the card 20, they provide information signal for positioning of the card 20 and determination of timing with which reproduction is initiated. The magnetic head 22 then reproduces or reads data out of the card 20.

When the optical sensor 24 detects an end of the card 20 after completion of the data reproduction of the card 20, the rotation of the motor 16 is reversed to return the card 20 back to the card inlet 14. The magnetic head 22 then records data on the card 20 during the returning of the card 20. When the completion of the data recording is detected by the optical sensors, the motor 16 decelerates to draw the card 20 slowly into the inside of the card reader 200 again.

When an image-forming area formed on the card 20 appears above the image-forming head 24, the optical sensors 32 and 33 provide signals to rotate the cam 29 to move the image-forming head 24 toward the card feeding path 21. The image-forming head 24 then engages the platen roller 50 to form a nip therebetween through which the card 20 travels to print given characters on the card 20.

Upon completion of the printing operation of the image-forming head 24, the card 20 is moved toward the card inlet 14 again and then ejected outside the card reader 200. During an interval until the card 20 is ejected from the card inlet 14, the data recorded on the card 20 is verified through the magnetic head 22.

After the card 20 is discharged from the card inlet 14, the motor 16 is turned off in response to a signal from the optical sensor 32.

Figure 7:
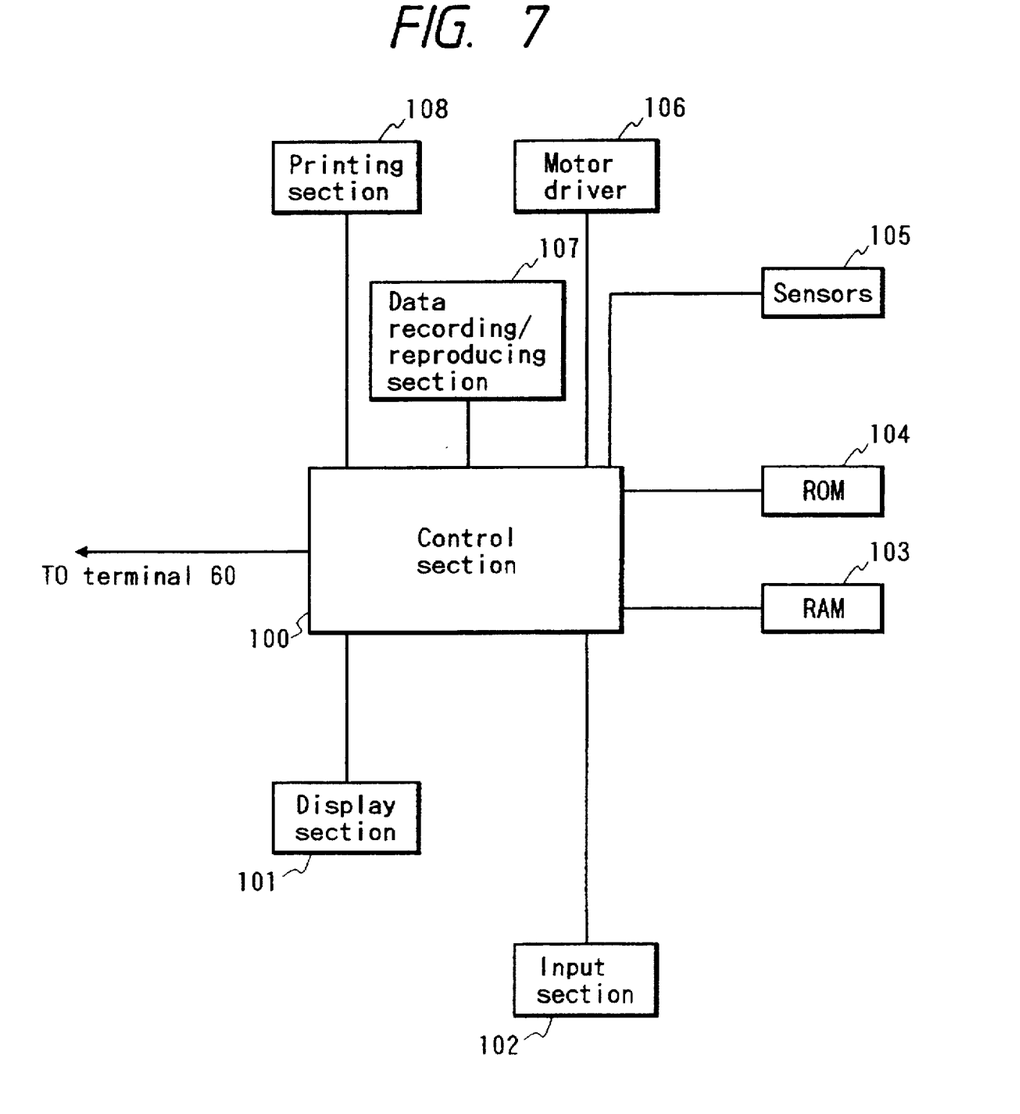
FIG. 7 is a circuit diagram of the card reader in FIG. 1.

FIG. 7 is a circuit diagram of the card reader 200 as discussed above.

A display section 101 is provided with the liquid crystal display 7 which displays the given characters in response to a signal from a control section 100. An input section 102 is provided with the keyboard 6 which inputs given data into the control section 100 and displays the data and registration numbers of goods through the display section 101. A RAM 104 stores therein the data inputted from the input section 102 and the data read out of the card 20. A ROM 104 stores therein a given program for controlling a sequence of operations of the card reader 200. A sensor section 104 is provided with the optical sensors 31, 32, 33, and 34. A motor driver 106 controls operations of the motors 16 and 26. A data recording/reproducing section 107 performs at least one of a data recording operation which records data on the card 20 through the magnetic head 22 and a data-reproducing operation which reproduces data from the card 20 through the magnetic head 22. A printing section 108 prints the given characters on the card 20 using the image-forming head 24.

The operations of the above arrangements will be described below.

First, given data such as a user identification (e.g., an ID number) and the price of a commodity is inputted into the control section 100 through the input section 102. The card 20 is then inserted into the card reader 200 through the card inlet 14.

When the sensor section 105 detects the insertion of the card 20, the control section 100 controls the motor driver 106, the data recording/reproducing section 107, and the printing section 108 according to the program stored in the ROM 104 to perform the mechanical operations, as discussed above.

The recording of data on the card 20 is accomplished by reading the data out of the ROM 104 through the control section 100, transferring the data to the data recording/reproducing section 107, and recording the data on the card 20 using the magnetic head 22.

The reproducing of data from the card 20 is accomplished by reading the data out of the card 20 through the data recording/reproducing section 107 and transferring the data to the control section 100 to store it in the RAM 103.

When a request signal is inputted from an external computer into the input/output terminal 60 to request that data stored in the card reader 200 is transferred to the external computer, the control section 100 reads the data out of the RAM 103 and transfers it to the external computer through the input/output terminal 60.

Figure 8:
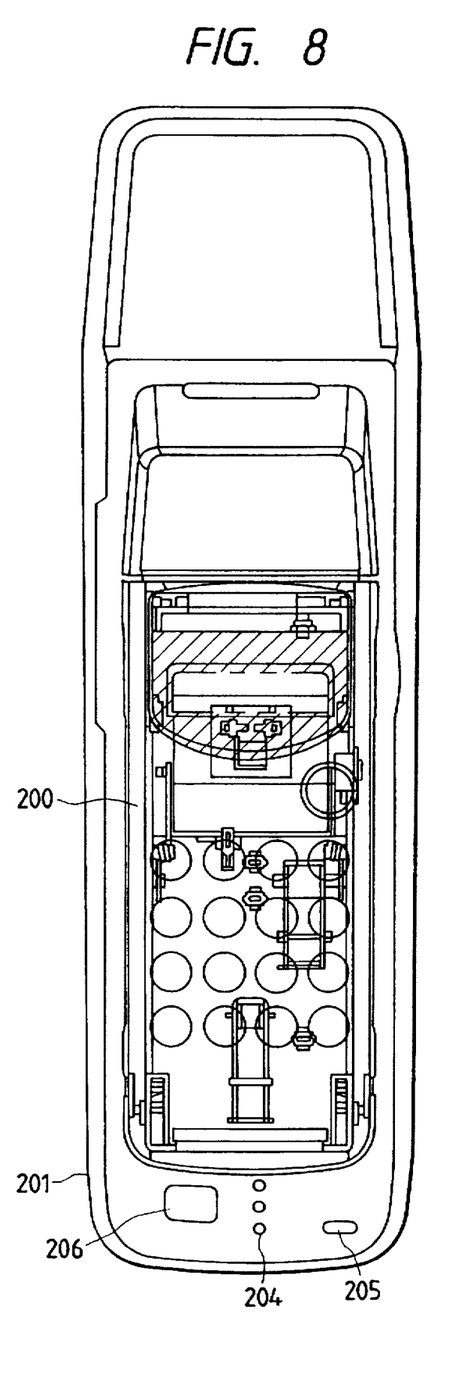
FIG. 8 is a plan view which shows a charging unit on which a card reader is disposed.
Figure 9:
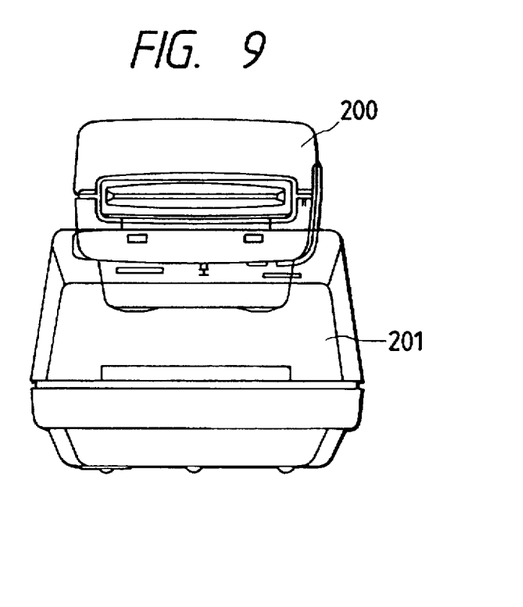
FIG. 9 is an end view of the charging unit in FIG. 8.
Figure 10:
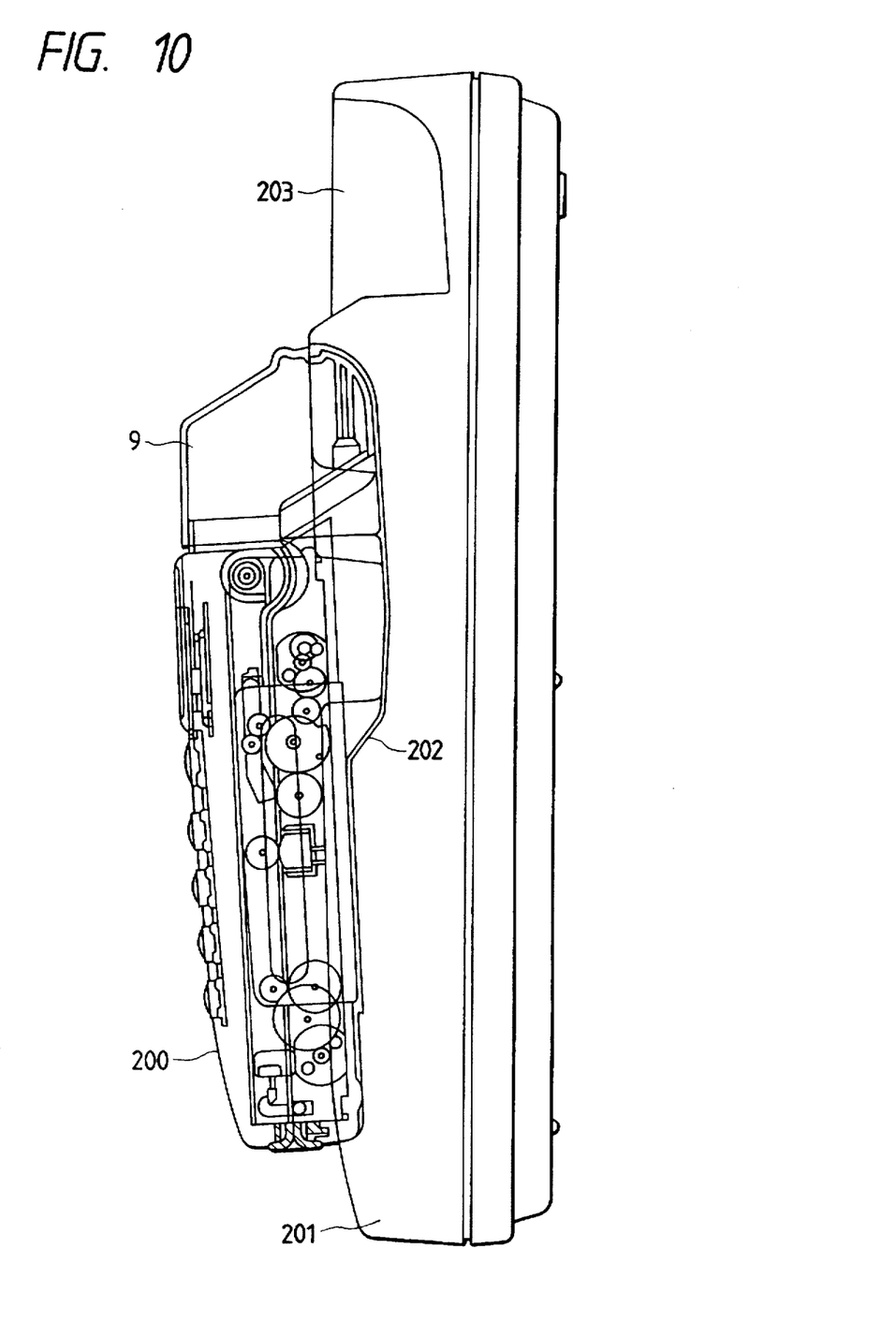
FIG. 10 is a side view of the charging unit in FIG. 8.

FIGS. 8, 9, and 10 show a charging unit 201 for the card reader 200 according to the invention.

The charging unit 201 includes a casing and a known charging circuit disposed within the casing. The casing has formed therein a recessed portion 202 for mounting the card reader 200 and a recessed portion 203 for mounting a spare battery (not shown). The recessed portion 202 has mounted thereon charging electrodes (not shown) for charging the battery 9 built in the card reader 200. Similarly, the recessed portion 203 has mounted thereon charging electrodes for charging the spare battery. These arrangements allow the spare battery which is fully charged to be replaced with the battery 9 immediately when the remaining capacity of the battery 9 is decreased below a given level.

The charging unit 201 further includes an indicator 204, a refresh switch 205, and a lock member 206. The indicator 204 shows a battery condition such as a charged capacity of the battery 9. The refresh switch 205 refreshes the battery 9 for avoiding reduction in performance of the battery 9. Usually, if a battery is recharged many times before it is fully discharged, it will cause the service life of the battery to be shortened extremely. For example, if the battery is recharged several times when the remaining capacity is decreased to 50%, the service life thereof is decreased by half an initial service life. In order to avoid this problem, the refresh switch 205 is provided which discharges the battery 9 fully before a charging operation is started. The lock member 206 fixes the card reader 200 on the charging unit 201 for preventing the card reader 200 from being dislodged during charge.

As apparent from the above discussion, the data stored in the RAM 103 can be read out through the input/output terminal 60 of the card reader 200. Thus, it is possible to store the purchasing of goods for every user in the RAM 103 as well as printing of data on the card 20 and comparison of data recorded on the card 20 with a user identification inputted through the keyboard 6. This facilities easy management of users and easy commodity management.

The body 1 of the card reader 200, as discussed above, consists of the casings 2 and 3 which are pivotably supported by the shaft 4 so as to be opened for exposing the card feeding path 21. This allows the card 20, if jammed in the feeding path 21, to be removed from the card reader 200 easily.

The card reader 200 is of the size, as shown below, for portability and easy handling (see FIGS. 1 and 2).

60 mm<L1 (width)<100 mm (preferably, about 80 mm)

150 mm<L2 (length)<300 (preferably, about 255 mm)

30 mm<L3 (thickness)<90 mm (preferably, about 60 mm)

100 g<W (weight)<1000 g (preferably, about 800 g)

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A card reader comprising:

a body including a first case and a second case which are pivotably supported by a shaft so as to be opened for exposing the inside of the body;

a storage battery disposed within said body and adjacent said shaft of said body;

a card feeding path defined in said body;

a feeding roller disposed within said body;

drive means for driving said feeding roller to feed a card inserted into an inlet formed in said body along said card feeding path, said drive means being disposed within said first case;

a data input mechanism disposed in said second case;

a display disposed in said second case;

data reading means for reading data out of the card;

printing means for printing a given character on the card; and control means for controlling operations of said data reading means and said printing means to perform at least one of functions of reading data out of the card during travel along said card feeding path and printing the given character on the card during travel along said card feeding path.

2. A card reader as set forth in claim 1, wherein the first and second casings are opened to expose said card feeding path.

3. A card reader as set forth in claim 1, wherein said data reading means reads out the data out of the card during travel along said card feeding path in a first feeding cycle, said printing means printing the given character on the card during travel along said card feeding path in a second feeding cycle.

4. A card reader as set forth in claim 3, further comprising a card inlet port formed in said body, and wherein the first direction is a direction from said card inlet port to said reading means.

5. A card reader as set forth in claim 1, wherein said body has a width, a length, a thickness, and a weight as shown below.

60 mm<width<100 mm 150 mm<length<300

30 mm<thickness<90 mm 100 g<weight<1000 g.

6. A card reader comprising:

a body including a first case and a second case which are pivotably supported by a shaft so as to be opened for exposing the inside of the body;

a storage battery disposed within said body and adjacent said shaft of said body;

a card feeding path defined in said body;

a feeding roller disposed within said body;

drive means for driving said feeding roller to feed a card inserted into an inlet formed in said body along said card feeding path, said drive means being disposed within the first case;

data reading means for reading data out of the card traveling along said card feeding path;

printing means for printing a given character on the card traveling along said card feeding path;

input means for inputting data into a memory disposed in said second case of said body;

a display disposed in said second case of said body;

storage means for storing the data read out of the card by said data reading means;

communication means for establishing communication with an external device; and data transferring means for transferring data stored in said storage means to the external device through said communication means in response to a request signal from the external device.

7. A card reader as set forth in claim 6, wherein said body includes a first case and a second case which are pivotably supported so as to be opened for exposing said card feeding path.

8. A card reader as set forth in claim 6, further comprising display means for displaying a given character.

9. A card reader as set forth in claim 8, wherein said display means displays the data inputted from the input means.

10. A card reader as set forth in claim 6, wherein said card feeding path is defined between the first and second casings of said body.

11. A card reader as set forth in claim 6, wherein said storage means includes a ROM storing therein a program for performing a sequence of operations of the card reader and a RAM storing therein the data read out of the card through said data reading means.

12. A card reader as set forth in claim 6, wherein said communication means includes an input/output terminal for electric connection with the external device.

13. A card reader as set forth in claim 6, wherein said printing means includes a thermal head.

14. A card reader as set forth in claim 6, wherein said storage battery comprises a rechargeable battery.

15. A card reader as set forth in claim 6, wherein said body has a width, a length, a thickness, and a weight as shown below, 60 mm<width<100 mm 150 mm<length<300

30 mm<thickness<90 mm 100 g<weight<1000 g.

16. A card reader charging apparatus comprising:

a charging body; and a first mount portion formed in said charging body for mounting a card reader to charge a storage battery built in the card reader, wherein the card reader includes:

a body including a first case and a second case which are pivotably supported by a shaft so as to be opened for exposing the inside of the body;

a storage battery disposed within said body adjacent said shaft of said body;

a card feeding path defined in said body;

a feeding roller disposed within said body;

drive means for driving said feeding roller to feed a card inserted into an inlet formed in said body along said card feeding path, said drive means being disposed within said first case;

data reading means for reading data out of the card traveling along said card feeding path;

printing means for printing a given character on the card traveling along said card feeding path;

input means for inputting data into a memory disposed in said second case of said body;

display means for displaying a given character, disposed in said second case of said body;

storage means for storing the data read out of the card by said data reading means;

communication means for establishing communication with an external device; and data transferring means for transferring data stored in said storage means to the external device through said communication means in response to a request signal from the external device.

17. A card reader charging apparatus as set forth in claim 16, further comprising a second mount portion formed in said charging body for mounting a spare storage battery to charge the spare storage battery.

18. A card reader charging apparatus as set forth in claim 17, wherein said first and second mount portion are provided with a recessed portion formed in said charging body.

19. A card reader charging apparatus as set forth in claim 16, wherein said body has a width, a length, a thickness, and a weight as shown below, 60 mm<width<100 mm 150 mm<length<300

30 mm<thickness<90 mm 100 g<weight<1000 g.

* * * * *